Patented Oct. 27, 1942

2,299,741

UNITED STATES PATENT OFFICE 2,299,741

PLASTICIZED VINYL COMPOUND

Gaetano F. D'Alelio, Pittsfield, Mass., assignor to General Electric Company, a corporation of New York No Drawing. Application November 25, 1940, Serial No. 367,117

11 Claims. (Cl. 260—36)

This invention relates broadly to new and useful compositions of matter comprising plasticized vinyl compounds. More particularly the invention is concerned with compositions comprising polymers and copolymers of vinyl halides, e. g., polyvinyl chloride, copolymers of vinyl chloride and vinyl acetate, etc., having incorporated therein a plasticizer comprising essentially a mono- or poly-carboxylic ester of a nuclearly halogenated, hydroxy aryl compound.

It has been known heretofore that artificial masses or synthetic rubber-like compositions may be made from polymers and copolymers of vinyl halides by plasticizing such polymeric material with compatible organic compounds of low volatility at elevated temperatures. A plasticizer heretofore widely used for softening polymers and copolymers of vinyl halides is tricresyl phosphate. Although such polymers and copolymers plasticized with tricresyl phosphate yield satisfactory products for most applications, films produced therefrom discolor at elevated temperatures and lose their flexibility. Moreover, at elevated temperatures such films show little or no strength.

I have discovered that the carboxylic esters of nuclearly halogenated, hydroxy aryl compounds act as plasticizers for polymers and copolymers of vinyl halides and impart to such compositions a marked stabilizing effect at elevated temperatures. Films or thin sheets prepared from such compositions are clear, almost colorless or of a light yellow color, flexible, tough, have considerable elasticity and excellent tensile strength. Furthermore, the presence of the halogen atoms in the aryl nucleus of the plasticizer markedly increases the compatibility of the plasticizer with the polymeric vinyl compound and causes the plasticizer to approach a true solution of the one body in the other rather than a mere dispersion of the two components. This improved compatibility makes it possible to lessen the milling time, or to use lower milling temperatures, or both, with obvious advantages, in compounding the plasticizer with the vinyl halide polymer or copolymer. This increased compatibility of the components also makes possible the introduction of the plasticizer into the monomer or mixture of monomers, or into the partial polymers or copolymers, and initiating or completing the polymerization of the polymerizable compound in the presence of the plasticizer. In this way the costly and time-consuming step of milling the plasticizer with the vinyl halide polymer or copolymer may be eliminated entirely.

Another advantage accruing from the use of the plasticizers herein-described results from the presence of the chemically bound halogen atoms in the plasticizer. The halogen atoms in the aryl nucleus of the ester increase the molecular weight and boiling point of the ester as compared with otherwise identical non-halogenated esters, thereby correspondingly decreasing its vapor pressure. This is a matter of great practical significance. It means that a formed plasticized composition (e. g., a molded article or in the form of extruded insulation on a wire or cable) will retain its flexibility and plasticity characteristics over a longer time than otherwise is possible, since the loss of plasticizer during use of the composition materially is reduced. Another advantage, as compared with heat-non-stable halo-aliphatic ester plasticizers, is that heat-stable compounds that do not evolve halogen under heat constitute the plasticizer. This stability of the plasticizer is due to the halogen present in the plasticizer. The halogen is attached to the aryl nucleus or ring and, therefore, is split off from the ring much less readily than is aliphatic halogen.

Examples of nuclearly halogenated, hydroxy aryl compounds that may be employed in forming esters thereof with carboxylic acids, and the resulting esters used as modifiers of vinyl halides in the form of polymers and copolymers, are:

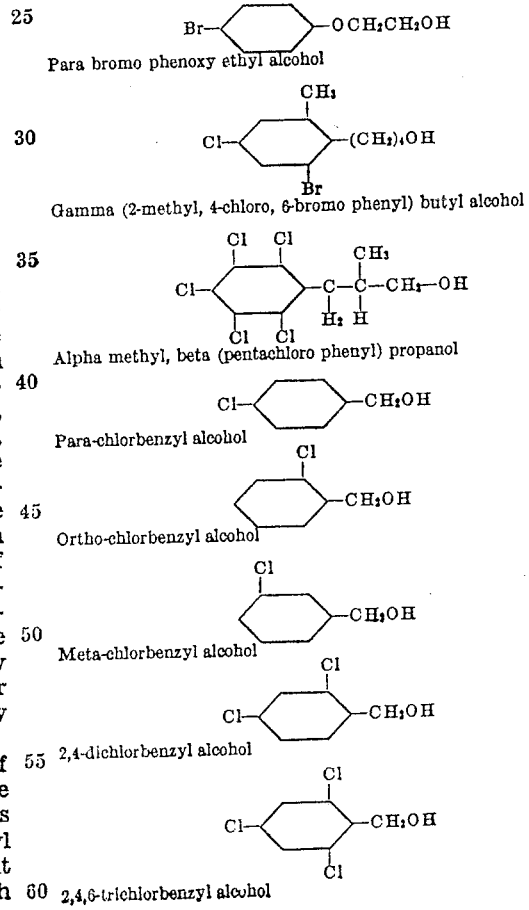

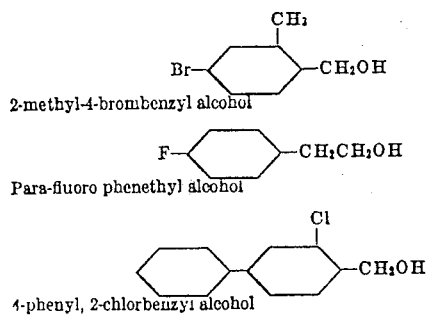

2-methyl-4-brombenzyl alcohol

Para-fluoro phenethyl alcohol 4-phenyl, 2-chlorbenzyl alcohol

Any suitable carboxylic acid may be used in preparing the ester plasticizer. Monocarboxylic acids may be used but, in general, polycarboxylic acids are preferred because of their higher boiling points and since they yield esters of lower vapor pressure as compared with the monocarboxylic esters of nuclearly halogenated, hydroxy aryl compounds. When monocarboxylic acids are employed, I prefer to use such acids having a boiling point above 200° C. at atmospheric pressure. In preparing the ester I prefer to use saturated or unsaturated polycarboxylic acids containing at least three carbon atoms, especially those containing at least six carbon atoms. Illustrative examples of polycarboxylic acids that may be employed are malonic, succinic, adipic, glutaric, sebacic, itaconic, fumaric, maleic, phthalic, citraconic, tricarballylic, cycloalkene polycarboxylic, etc., or anhydrides of such acids if available may be used.

In producing the new synthetic compositions of this invention optimum results are obtained with a plasticizer comprising essentially an ester derived from a carboxylic acid containing at least two carboxylic groups and at least six carbon atoms and a nuclearly halogenated aromatic hydroxy compound containing at least six carbon atoms. Illustrative examples of such esters are the di-(mono-chlorbenzyl) esters, di-(poly-chlorbenzyl) esters, etc., e. g., di-(para-chlorbenzyl) sebacate, di-(ortho-chlorbenzyl) adipate, di-(dichlorbenzyl) glutarate, di-(trichlorbenzyl) phthalate, di-(pentachlorbenzyl) sebacate, etc., or mixtures thereof.

The polymers and copolymers of vinyl halides may be plasticized with the herein-described esters alone or in conjunction with other plasticizers when particular properties not otherwise obtained are desired. Varying amounts of plasticizer may be incorporated into the vinyl halide polymer or copolymer depending, for example, upon the particular starting materials employed and the particular properties desired in the end-product. Ordinarily, however, the proportion of plasticizers does not exceed substantially 60 per cent by weight of the mixed components and, in the case of some copolymer compositions, may be only a relatively small amount of the order of 2 or 3 per cent by weight of the mixture.

In order that those skilled in the art better may understand how the present invention may be carried into effect, the following illustrative examples thereof are given. All parts are by weight.

*Example 1*

This example illustrates the results obtained when unplasticized polyvinyl chloride is sheeted and molded.

Sixty-six parts by weight of polyvinyl chloride were sheeted on hot rolls at a temperature corresponding approximately to a steam pressure of 20 pounds per square inch, working on the rolls being continued for five minutes after the first formation of a sheet. The sheet material was very dark in color. It was used (1) in preparing a molded test disk and (2) for testing the flow or plasticity characteristics after reducing the sheet to the necessary size.

The molded test disk was prepared by molding pieces of the broken sheet under a pressure of 2,000 pounds per square inch and at a temperature corresponding to a steam pressure of 180 to 190 pounds per square inch until the material softened and the excess flowed from the mold. Steam immediately was turned off the mold and the mold cooled by circulating water through the jacket. The molded disc was brittle, opaque, very dark-colored, had a dynstat flexual strength of only 8,370 pounds per square inch, a dynstat impact strength of only 0.055 foot pound and a dynstat angle of bend of only 6.7°.

When a small pill of the sheeted polyvinyl chloride was tested for flow characteristics on a standard Baekeland flow tester, it required more than 90 seconds for the material to flow 1½ inches at a temperature corresponding to 190 pounds steam pressure.

The loss in weight on heating a 2½-inch square of the sheet material, about 35 or 40 mils thick, in an air oven maintained at a constant temperature of 125° C. for 22 hours was 1.06%.

Example 1 represents the production of a control sample with which the plasticized compositions described in examples that follow were compared to evaluate the effect of the plasticizer.

*Example 2*

Fifty-five parts polyvinyl chloride and 11 parts tricresyl phosphate were thoroughly mixed to form a homogeneous composition, which was sheeted, molded and tested as described under Example 1. The sheet material was very dark in color, while the molded disc was even darker and almost opaque. Test data are given below:

| | |
|---|---|
| Dynstat flexural strength | 6,300 pounds per sq. in. |
| Dynstat impact strength | 0.03 foot pound |
| Dynstat angle of bend | 7° |
| Loss on heating for 22 hours at 125° C | 2.97% |
| Baekeland flow value at same temperature as in Ex. 1 | 43 seconds to flow 1½ inches |

Comparing the above tests on the plasticized composition of this example with the unplasticized composition of Example 1, it will be noted that although the plasticity of the composition has been improved, there is a decrease in the flexural and impact strength. Furthermore, the loss on heating for 22 hours at 125° C. is increased, due to the volatilization of the plasticizer, from 1.06% to 2.97%.

*Example 3*

The same procedure was followed as described under Examples 1 and 2 with the exception that 55 parts polyvinyl chloride and 11 parts di-(ortho-chlorbenzyl) adipate were mixed, sheeted, molded and tested. Both the sheet material and the molded test disk were clear and light in color. Test data follow:

| | |
|---|---|
| Dynstat flexural strength | 11,027 pounds per sq. in. |
| Dynstat impact strength | 0.194 foot pound |
| Dynstat angle of bend | 14.3° |
| Loss on heating for 22 hours at 125° C | 2.16% |
| Baekeland flow value at same temperature as in Ex. 1 | 45 seconds to flow 1½ inches |

It will be noted from a comparison of the results of the tests on this composition with the tricresyl phosphate plasticized composition of Example 2 that the di-(ortho-chlorbenzyl) adipate causes a marked increase in the flexural and impact strengths and also in the angle of bend. Furthermore, the loss on heating at 125° C. is considerably less (2.16% as compared with 2.97%).

*Example 4*

Same procedure as under Examples 1 and 2 with the exception that 55 parts polyvinyl chloride and 11 parts di-(para-chlorbenzyl) sebacate were mixed, sheeted, molded and tested. Both the sheet material and the molded test disk were clear and light-colored. Test data follow:

| | |
|---|---|
| Dynstat flexural strength | 8,817 pounds per sq. in. |
| Dynstat impact strength | 0.167 foot pound |
| Dynstat angle of bend | 14.8° |
| Loss on heating for 22 hours at 125° C | 1.28% |
| Baekeland flow value at same temperature as in Ex. 1 | 43 seconds to flow 1½ inches |

Comparing the test results on this sample with those of Example 2, wherein tricresyl phosphate was employed as plasticizer, it will be noted not only that the flexural and impact strengths and angle of bend is unexpectedly higher, but also that the loss on heating the plasticized composition for 22 hours at 125° C. is only 1.28% as compared with 1.06% for the non-plasticized blank (product of Example 1) and 2.97% for the polyvinyl halide-tricresyl phosphate composition.

*Example 5*

Same procedure as under Examples 1 and 2 with the exception that 55 parts polyvinyl chloride and 11 parts bis-(di-chlorbenzyl) sebacate, more particularly di-(ortho-chloro, para-chloro benzyl) sebacate, were mixed, sheeted, molded and tested. Both the sheet material and the molded disk were clear and light in color. Test data follow:

| | |
|---|---|
| Dynstat flexural strength | 10,720 pounds per sq. in. |
| Dynstat impact strength | 0.175 foot pound |
| Dynstat angle of bend | 12.3° |
| Loss on heating for 24 hours at 125° C | 0.716% |
| Baekeland flow value at same temperature as in Example 1 | 37 seconds to flow 1½ inches |

Here again it will be noted that the flexural and impact strengths and the angle of bend are markedly better than the tricresyl phosphate plasticized composition of Example 2. Even more surprising is the fact that the results of heating the composition even for a longer time (24 hours as compared with 22 hours) at 125° C. showed a loss on heating less than that of the plasticizer-free blank (0.716% as compared with 1.06% for the blank, that is, the product of Example 1). The test was carefully checked with substantially the same results. Apparently, in some unexplainable manner, the presence of the di-(ortho-chloro, para-chloro benzyl) sebacate inhibits the vaporization of the polyvinyl chloride component when the composition is subjected to elevated temperatures.

*Example 6*

Same procedure was followed as described under Example 1 with the exception that a copolymer of a vinyl halide, more particularly a copolymer of vinyl chloride and vinyl acetate ("Vinylite VYNK #74,212" produced and sold by Carbide and Carbon Chemicals Corporation), was employed. Molding of the sheet material caused it to darken considerably. The loss on heating a sample for 30 hours at 125° C. was 1.05%. The Baekeland flow value at a temperature corresponding to about 50 pounds steam pressure was 60 seconds to flow 1½ inches.

*Example 7*

A vinyl chloride-vinyl acetate copolymer (60 parts) such as described in Example 6 was worked on hot rolls to form a continuous sheet at a temperature corresponding to a steam pressure of 20 pounds per square inch after which 10 per cent by weight thereof (6 parts) of di-(ortho-chlorbenzyl) adipate was dusted on the sheet. Thereafter the sheet was worked for five minutes on the rolls to insure complete and uniform distribution of the plasticizer throughout the mass. A molded test disk was prepared as described in Example 1. Both the sheet material and the molded disk were clear and very light in color. The improved plasticity of the composition is shown by the fact that, whereas the flow value of the unplasticized material (Example 6) was 60 seconds, the flow value of this plasticized composition was 33 seconds under the same test conditions.

*Example 8*

Same as in Example 7 with the exception that 6 parts di-(para-chlor-benzyl) sebacate were used in place of di-(ortho-chlorbenzyl) adipate. Both the sheet material and the molded disk were clear and very light-colored. The loss on heating for 30 hours at 125° C. was practically the same as the unplasticized material (1.06% against 1.05%). The Baekeland flow value was 27 seconds as compared with 60 seconds for the non-plasticized copolymer. The dynstat impact strength was much higher than the unplasticized copolymer (0.157 foot pound against 0.067 foot pound).

*Example 9*

Same procedure was followed as described in Example 7 with the exception that 6 parts di-(ortho, para-dichlorbenzyl) sebacate were used in place of di-(ortho-chlorbenzyl) adipate. Both the sheet material and the molded disk were clear and very light in color. As in the case of the product of Example 5 where polyvinyl chloride was employed, here again it was noted that heating the composition for even as long as 24 hours at 125° C. resulted in a loss even less than that of the plasticizer-free blank (0.47% against 1.05% for the blank, that is, the product of Example 6). The test was carefully checked with substantially the same results. The Baekeland flow value was 20 seconds as compared with 60 seconds for the unplasticized copolymer. The dynstat flexural and impact strengths and angle of bend of the plasticized copolymer were practically the same as the values obtained for the nonplasticized copolymer.

The plasticized compositions of this invention also have exceptional flexibility at low temperatures. For example, when equal parts by weight of polyvinyl chloride (or a copolymer of vinyl chloride and, for instance, vinyl acetate) are homogeneously mixed with di-(ortho-chlorbenzyl) adipate, di-(para-chlorbenzyl) sebacate or di-(ortho, para-dichlorbenzyl) sebacate and thin sheets of the sheeted products placed in the evaporative unit of an electric refrigerator for a period sufficient to attain the unit's temperature (20 minutes), the flexibility of the sheet is maintained even at such low temperatures (—5° to —15° C., for example). Thus, a copolymer of vinyl chloride and vinyl acetate plasticized with 50% by weight thereof of di-(ortho, para-dichlorbenzyl) sebacate was so flexible even after 20 minutes in the evaporative unit of a refrigerator that it could be turned over on itself around a mandrel of very small diameter (about ¼ inch in diameter).

Of course it will be understood by those skilled in the art that my invention is not limited to the specific components named in the above illustrative examples nor to the specific proportions therein given. Thus, instead of polyvinyl chloride, other polyvinyl halides may be employed, for example polyvinyl bromide or polyvinyl iodide. Compositions comprising polyvinyl iodide should be avoided where resistance to discoloration at elevated temperatures is important. Also, instead of copolymer of vinyl chloride and vinyl acetate, I may use a copolymer of a vinyl halide and any other organic compound copolymerizable therewith, for example; copolymers of vinyl chloride and vinylidene halides, specifically vinylidene chloride; copolymers of vinyl chloride and vinyl hexoate; copolymers of vinyl halides and vinyl ethers; copolymers of vinyl halides and vinyl ketones; copolymers of vinyl halides and itaconic esters such, for instance, as dipropyl itaconate, dibenzyl itaconate, di-isoamyl itaconate, etc.; copolymers of vinyl halides and acrylic and alkacrylic compounds, for example, methyl acrylate, ethyl acrylate, propyl acrylate, phenyl acrylate, benzyl acrylate, chlorbenzyl acrylates, cyclohexyl acrylate, cresyl acrylate, phenethyl acrylate, tetrahydrofurfuryl acrylate, ethyl methacrylate, methoxyethyl acrylate, methyl atropate, atropic nitrile, etc.; copolymers of a vinyl halide and a diene, e. g., a copolymer of vinyl chloride and 2-chloro-butadiene-1,3; etc. I prefer to use copolymers such as described and claimed, for example, in my copending application Serial No. 367,116, filed concurrently herewith and assigned to the same assignee as the present invention; that is, the copolymerization product of a polymerizable mixture comprising essentially vinyl halide, specifically vinyl chloride, and an arylalkanol ester of acrylic acid, specifically a benzyl (or a mono- or poly-chlorbenzyl) acrylate. Such copolymers also may contain, where improved solvent resistance is desired, not over 0.5% by weight of a polymerizable compound containing a plurality of polymerizable groupings at least one of which is a

grouping, e. g., allyl acrylate.

The polymers and copolymers of vinyl halides which are plasticized in accordance with the present invention may be prepared by methods now well known in the art, for instance under polymerization influences such as described in various copending applications of mine, for example, application Serial No. 313,103, filed January 9, 1940, and assigned to the same assignee as the present invention.

Another advantage that accrues from my invention is the improved compatibility of these new compositions with heat, light and electrical stabilizers as compared with the previously known plasticized polymers and copolymers of vinyl halides. The most effective class of stabilizers are the lead derivatives of phenol and substituted phenols, that is, hydroxy aryl compounds, for example cresols, xylenols, salicylic esters, naphthols, etc. Lead para-chloro phenate, lead phenyl phenate and lead tertiary amyl phenates are particularly adapted to the stabilization of the plasticized compositions of this invention. Cadmium derivatives of hydroxy aryl compounds also may be employed.

The herein-described compositions comprising (1) the product of polymerization of a mass comprising essentially a vinyl halide and (2) a carboxylic ester of a nuclearly halogenated, hydroxy aryl compound have a wide variety of industrial applications. Thus, with or without fillers, e. g., asbestos, they may be used as insulation material, for instance as insulation for electrical conductors. The extrudable compositions may be extruded at temperatures of the order of 100° to 175° C. upon a conducting core, e. g., a copper wire, or the soluble compositions may be applied in the form of a varnish and the varnish baked upon the wire. They also may be employed in the production of molding compositions and molded articles, as adhesives, coating and impregnating agents, etc.

What I claim as new and desire to secure by Letters Patent of the United States is:

1. A composition comprising (1) the product of polymerization of a mass comprising essentially a vinyl halide and (2) a polycarboxylic ester of a nuclearly halogenated, benzyl alcohol.

2. A composition comprising (1) the product of polymerization of a mass comprising essentially vinyl chloride and (2) a nuclearly halogenated benzyl alcohol polyester of a polycarboxylic acid.

3. A composition comprising (1) the product of polymerization of a mass comprising essentially vinyl chloride and (2) a nuclearly chlorinated benzyl alcohol diester of a dicarboxylic acid containing at least six carbon atoms.

4. A composition comprising (1) the product of polymerization of a mass comprising a vinyl halide and an aryl acrylic compound and (2) a polycarboxylic ester of a nuclearly halogenated, benzyl alcohol.

5. A composition comprising (1) the product of polymerization of a mass comprising vinyl chloride and an arylalkanol ester of acrylic acid and (2) a plasticizer for said polymerization product comprising a polycarboxylic ester of a nuclearly chlorinated, benzyl alcohol.

6. A composition comprising a copolymer of vinyl chloride and a benzyl acrylate plasticized with at least one nuclearly chlorinated benzyl alcohol diester of a dicarboxylic acid containing at least six carbon atoms.

7. A composition comprising a copolymer of vinyl chloride and a chlorbenzyl acrylate plasticized with a nuclearly chlorinated benzyl alcohol diester of a dicarboxylic acid containing at least six carbon atoms.

8. A composition comprising a copolymer of vinyl chloride and a benzyl acrylate plasticized with a mixture of nuclearly chlorinated benzyl alcohol diesters of a dicarboxylic acid containing at least six carbon atoms.

9. A composition comprising (1) the product of polymerization of a mass comprising vinyl chloride and a benzyl acrylate and (2) a plasticizer for said polymerization product comprising di-(ortho-chlorbenzyl) adipate.

10. A composition comprising (1) the product of polymerization of a mass comprising vinyl chloride and a benzyl acrylate and (2) a plasticizer for said polymerization product comprising di-(para-chlorbenzyl) sebacate.

11. A composition comprising (1) the product of polymerization of a mass comprising vinyl chloride and a chlorinated benzyl acrylate and (2) a plasticizer for said polymerization product comprising di-(poly-chlorbenzyl) sebacate.

GAETANO F. D'ALELIO.